(12) United States Patent
Suzuki

(10) Patent No.: US 8,159,746 B2
(45) Date of Patent: Apr. 17, 2012

(54) OPTICAL APPARATUS WITH IMAGE STABILIZING AND MOVABLE LENSES AND ACTUATORS FOR SHIFTING AND/OR MOVING THE LENSES

(75) Inventor: Nobuyoshi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 12/415,368

(22) Filed: Mar. 31, 2009

(65) Prior Publication Data

US 2009/0251777 A1 Oct. 8, 2009

(30) Foreign Application Priority Data

Apr. 3, 2008 (JP) .................... 2008-096903

(51) Int. Cl.
*G02B 27/64* (2006.01)
(52) U.S. Cl. ............ 359/557; 396/55; 348/208.11
(58) Field of Classification Search .............. None
See application file for complete search history.

(56) References Cited

U.S. PATENT DOCUMENTS

| | | | |
|---|---|---|---|
| 6,819,500 B2 | 11/2004 | Tsuzuki | |
| 2003/0184878 A1 | 10/2003 | Tsuzuki | |
| 2005/0254806 A1* | 11/2005 | Noguchi | 396/55 |

FOREIGN PATENT DOCUMENTS

| | | |
|---|---|---|
| CN | 1773320 A | 5/2006 |
| JP | 2000-193875 A | 7/2000 |
| JP | 2003-075880 A | 3/2003 |
| JP | 2003-295249 | 10/2003 |
| WO | 2006-100804 A1 | 9/2006 |

OTHER PUBLICATIONS

The above references were cited in a Jul. 13, 2010 Chinese Office Action, which is enclosed with English Translation, that issued in Chinese Patent Application No. 200910133339.8.

* cited by examiner

*Primary Examiner* — Arnel C Lavarias
(74) *Attorney, Agent, or Firm* — Cowan, Liebowitz & Latman, P.C.

(57) ABSTRACT

The optical apparatus includes an image stabilizing lens shiftable with respect to an optical axis, a movable lens movable in an optical axis direction, first and second actuators shifting the image stabilizing lens, and a third actuator moving the movable lens. The first, second and third actuators include a magnet and a coil. When viewed in the optical axis direction, the first and second actuators are disposed in a first area and the third actuator is disposed in a second area, the first and second areas being opposite to each other with respect to the optical axis. The first and second actuators are respectively disposed in areas in the first area opposite to each other with respect to a straight line passing the optical axis and the third actuator. This arrangement enables reduction of magnetic interference between the first and second actuators and the third actuator.

12 Claims, 13 Drawing Sheets

WIDE

TELE

OPTICAL APPARATUS WITH IMAGE STABILIZING AND MOVABLE LENSES AND ACTUATORS FOR SHIFTING AND/OR MOVING THE LENSES

BACKGROUND OF THE INVENTION

The present invention relates to an optical apparatus including actuators which respectively drives an image stabilizing lens and a movable lens.

An optical apparatus such as an image pickup apparatus or an interchangeable lens is provided with an actuator that moves a movable lens which is movable in a direction of an optical axis of an optical system to perform variation of magnification or focusing. Further, such an optical apparatus includes, in order to suppress image shaking caused by hand jiggling, an image stabilizing mechanism including an image stabilizing lens which is shiftable with respect to the optical axis of the optical system and two actuators which shift the image stabilizing lens in a pitch direction and a yaw direction.

As an actuator shifting the image stabilizing lens, an actuator comprises a coil and a magnet is generally used. On the other hand, as an actuator moving the movable lens, a rotation type motor or a linear actuator (voice coil motor) comprises a coil and a magnet may be used.

Japanese Patent Laid-Open No. 2003-295249 discloses an optical apparatus in which, when viewed in a direction of an optical axis, an actuator for moving a movable lens (hereinafter referred to as "lens moving actuator") and one of two actuators for shifting an image stabilizing lens (hereinafter referred to as "image stabilizing actuators") are arranged at positions symmetric to each other with respect to a position of the optical axis. Such an arrangement can achieve miniaturization of the optical apparatus in its radial direction and its optical axis direction.

However, in the optical apparatus disclosed in Japanese Patent Laid-Open No. 2003-295249, a distance between the lens moving actuator and the one of the two image stabilizing actuators is extremely shorter than that between the lens moving actuator and the other one of the two image stabilizing actuators. Therefore, the lens moving actuator and the one of the two image stabilizing actuators magnetically interfere with each other, which influences operations of these actuators.

Moreover, when the distance between the lens moving actuator and the image stabilizing actuator is short, leakage magnetic fluxes from the lens moving actuator and the image stabilizing actuator influence magnetic sensors such as hall sensors or MR sensors which detect positions of the respective lenses. In this case, positional detection accuracy of the magnetic sensors may be decreased.

SUMMARY OF THE INVENTION

The present invention provides an optical apparatus capable of reducing magnetic interference between an actuator for moving a movable lens and an actuator for shifting an image stabilizing lens and capable of suppressing magnetic influence due to the actuators on magnetic sensors detecting positions of the lenses.

The present invention provides as an aspect thereof an optical apparatus including an image stabilizing lens which is shiftable with respect to an optical axis of an optical system, a movable lens which is movable in a direction of the optical axis, a first actuator and a second actuator each of which comprises a magnet and a coil, the first and second actuators shifting the image stabilizing lens in directions different from each other, and a third actuator which comprises a magnet and a coil and moves the movable lens. When viewed in the direction of the optical axis, the first and second actuators are disposed in a first area and the third actuator is disposed in a second area, the first and second areas being opposite to each other with respect to the optical axis, and the first and second actuators are respectively disposed in areas in the first area which are opposite to each other with respect to a straight line passing a position of the optical axis and the third actuator.

The present invention provides as another aspect thereof an optical apparatus including an image stabilizing lens which is shiftable with respect to an optical axis of an optical system, a movable lens which is movable in a direction of the optical axis, a first actuator and a second actuator each of which comprises a magnet and a coil, the first and second actuators shifting the image stabilizing lens in directions different from each other, and a third actuator which comprises a magnet and a coil and moves the movable lens. When viewed in the direction of the optical axis, the third actuator is disposed at a position away from the optical axis by a first distance, and the first and second actuators are disposed at positions away from the third actuator by a second distance longer than the first distance.

Other aspects of the present invention will become apparent from the following description and the attached drawings.

DESCRIPTION OF THE EMBODIMENTS

Exemplary embodiments of the present invention will hereinafter be described with reference to the accompanying drawings.

Embodiment 1

Figure 1:
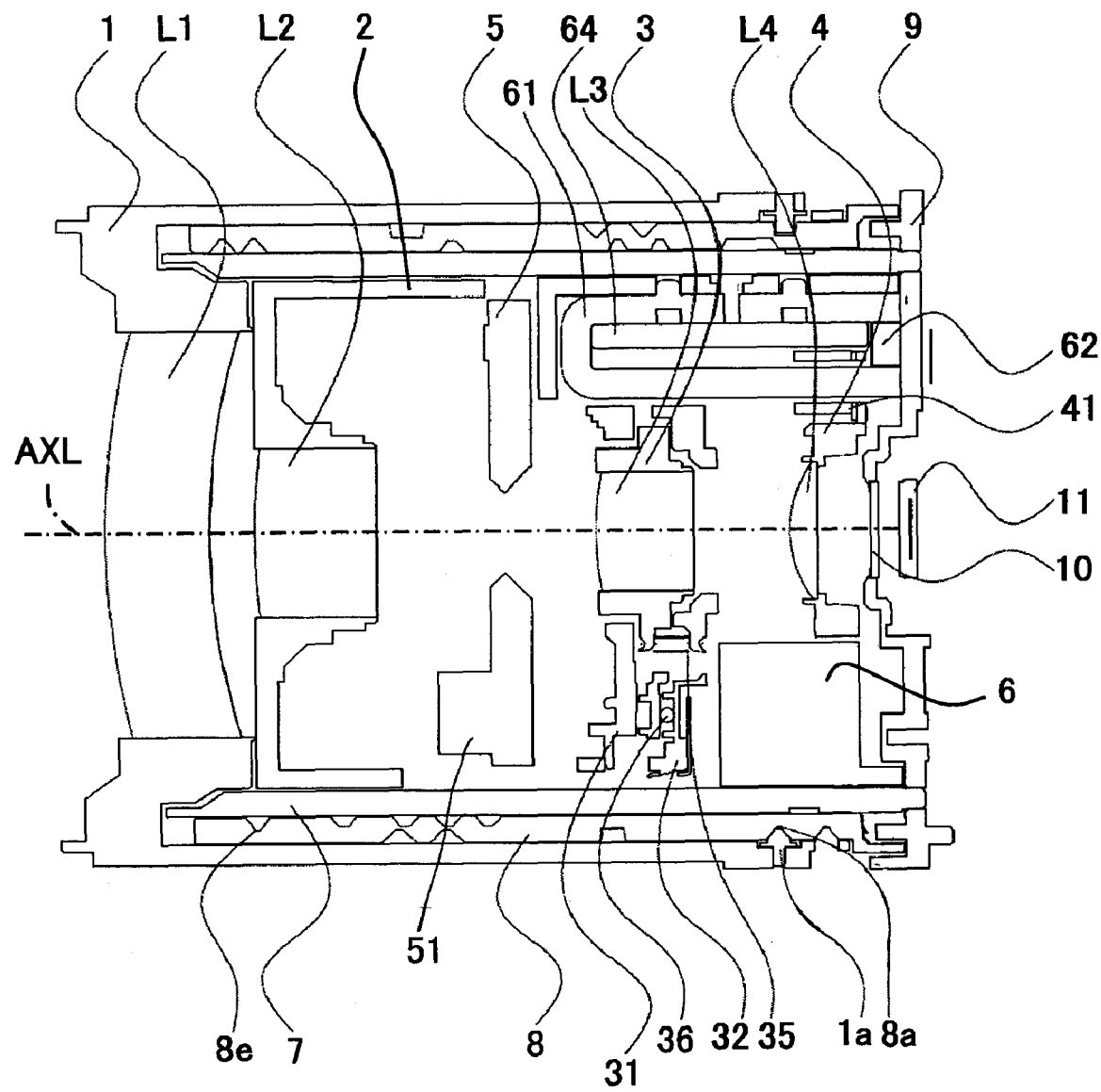
FIG. 1 is a side cross sectional view showing the configuration of a lens barrel part (retracted position) of an image pickup apparatus that is Embodiment 1 of the present invention.
Figure 2:
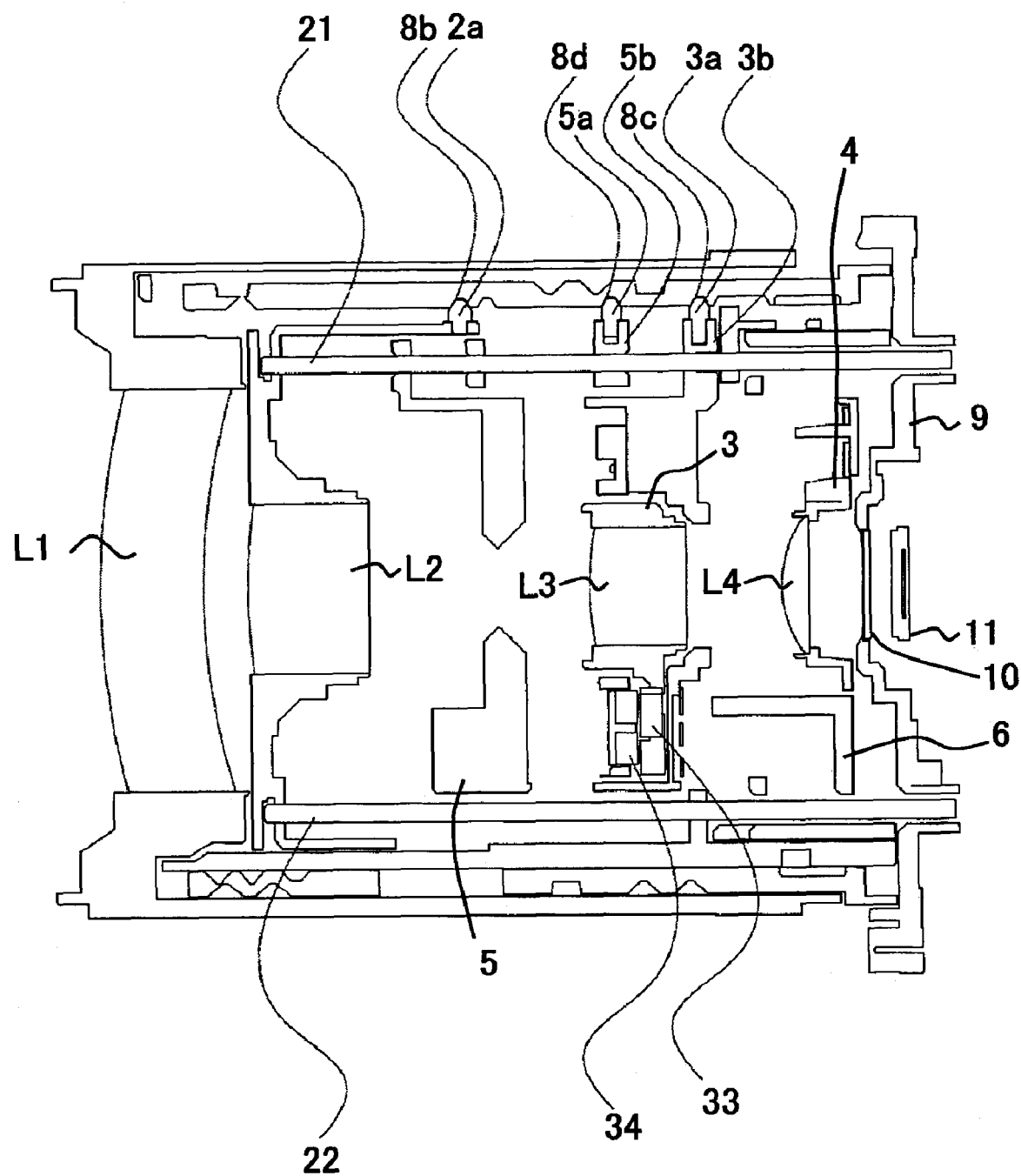
FIG. 2 is a top cross sectional view showing the configuration of the lens barrel part (retracted position) in Embodiment 1.
Figure 3:
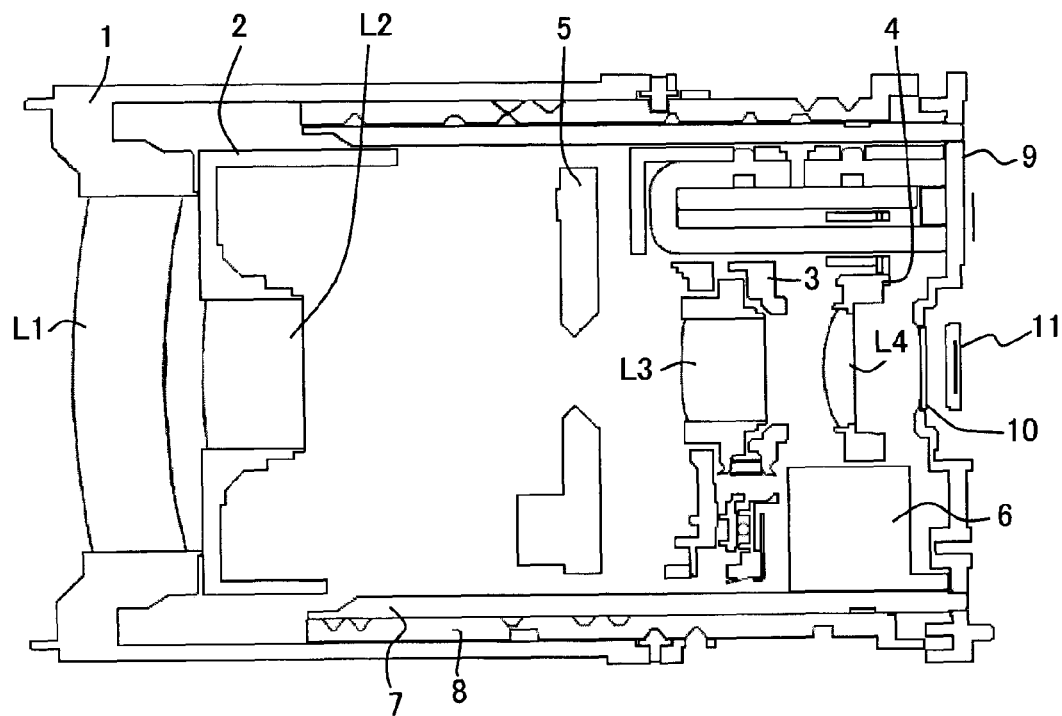
FIG. 3 is a side cross sectional view showing the configuration of the lens barrel part (WIDE position) in Embodiment 1.
Figure 4:
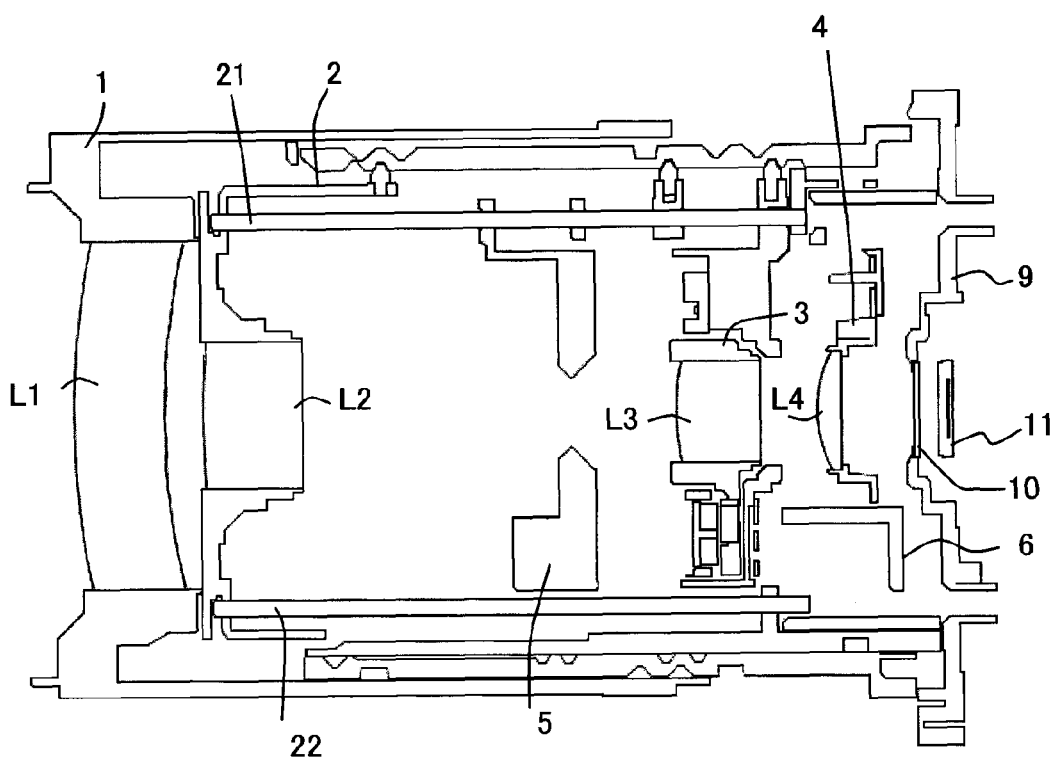
FIG. 4 is a top cross sectional view showing the configuration of the lens barrel part (WIDE position) in Embodiment 1.
Figure 5:
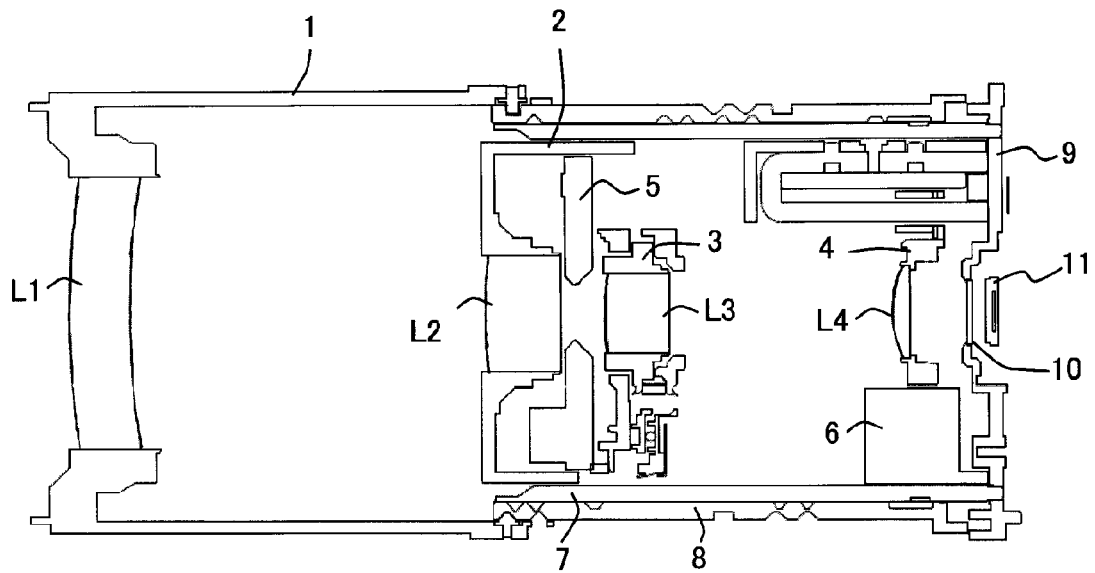
FIG. 5 is a side cross sectional view showing the configuration of the lens barrel part (TELE position) in Embodiment 1.
Figure 6:
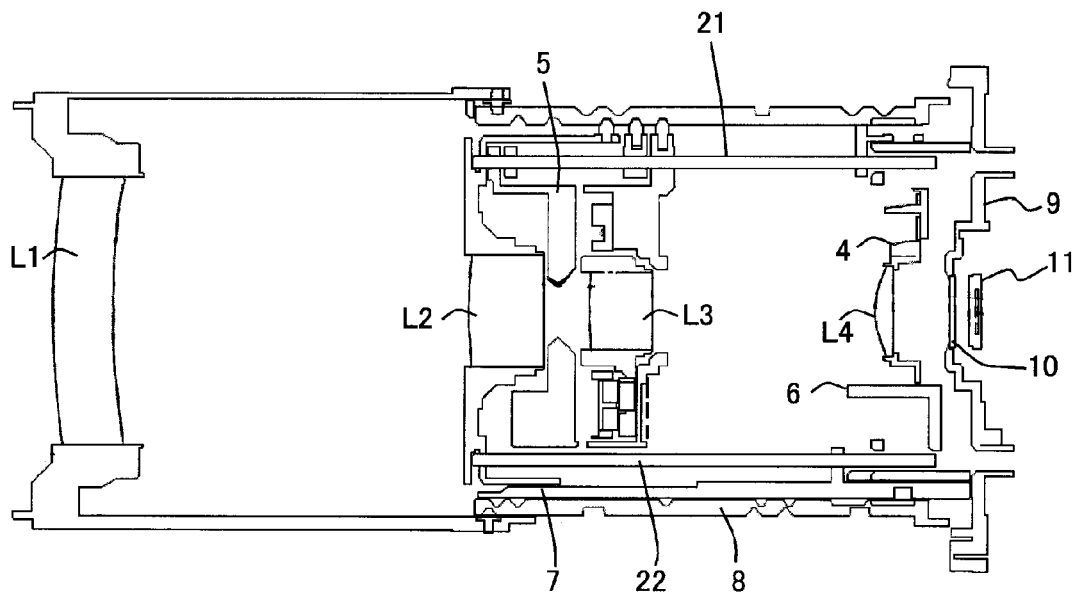
FIG. 6 is a top cross sectional view showing the configuration of the lens barrel part (TELE position) in Embodiment 1.

FIGS. 1 to 6 show the configuration of a lens barrel part of an image pickup apparatus (a digital still camera or a video camera) as an optical apparatus that is a first embodiment (Embodiment 1) of the present invention. FIG. 1 is a side cross sectional view of the lens barrel part at its retracted position. FIG. 2 is a top cross sectional view of the lens barrel part at the retracted position. FIG. 3 is a side cross sectional view of the lens barrel part at its WIDE (wide-angle end) position, and FIG. 4 is a top cross sectional view of the lens barrel part at the WIDE position. FIG. 5 is a side cross sectional view of the lens barrel part at its TELE (telephoto end) position. FIG. 6 is a top cross sectional view of the lens barrel part at the TELE position.

The lens barrel unit includes thereinside an optical system comprises a first lens unit L1, a second lens unit L2, a third lens unit (correcting lens that is an image stabilizing lens) L3 and a fourth lens unit (focus lens that is a movable lens) L4 which are arranged in order from an object side. Reference character AXL denotes an optical axis of the optical system.

Reference numeral 1 denotes a first lens holding barrel which holds the first lens unit L1. Cam pins 1a are provided at three circumferential places on an inner circumferential surface of the first lens holding barrel 1. These cam pins 1a engage with three cam grooves 8a formed on an outer circumferential surface of a cam barrel 8. Moreover, straight grooves (not shown) extending in a direction of the optical axis (hereinafter referred to as "optical axis direction") are formed at three circumferential places on the inner circumferential surface of the first lens holding barrel 1. Straight keys (not shown) formed on an outer circumferential surface of a fixed barrel 7 engage with the straight grooves.

Reference numeral 2 denotes a second lens holding barrel which holds the second lens unit L2. Cam pins 2a are provided at three circumferential places on an outer circumferential surface of the second lens holding barrel 2. The cam pins 2a engage with three cam grooves 8b formed on an inner circumferential surface of the cam barrel 8. The cam pins 2a also engage with straight grooves (not shown) formed in the fixed barrel 7 so as to extend in the optical axis direction.

The fixed barrel 7 holds the first and second lens holding barrels 1 and 2 to prevent their rotation. Cam pins (not shown) are provided at three circumferential places on the outer circumferential surface of the fixed barrel 7. The cam pins engage with three cam grooves 8e formed on the inner circumferential surface of the cam barrel 8.

Reference numeral 5 denotes an aperture stop unit. Cam pins 5a provided on an outer circumferential surface of the aperture stop unit 5 engage with cam grooves 8d formed on the inner circumferential surface of the cam barrel 8. A sleeve portion 5b and a rotation stopping portion (not shown) are formed in the aperture stop unit 5, which respectively engage with guide bars 21 and 22 so as to be movable in the optical axis direction. The guide bars 21 and 22 are supported by the second lens holding barrel 2 and an image sensor base plate 9 which will be described later. Reference numeral 51 denotes a stop actuator for opening and closing stop blades, not shown, in the aperture stop unit 5, the stop actuator being a stepping motor, for example. The aperture stop unit 5 functions as a shutter in still image taking.

Reference numeral 3 denotes a third lens holding frame holding the correcting lens L3. The correcting lens L3 and the third lens holding frame 3 constitute part of an image stabilizing unit. The third lens holding frame 3 is held by a sensor holding frame 32 of the image stabilizing unit so as to be shiftable in a direction orthogonal to the optical axis AXL (hereafter referred to as "orthogonal-to-optical-axis direction"). Reference numeral 31 denotes a coil holding frame that constitutes a base portion of the image stabilizing unit with the sensor holding frame 32.

Figure 9:
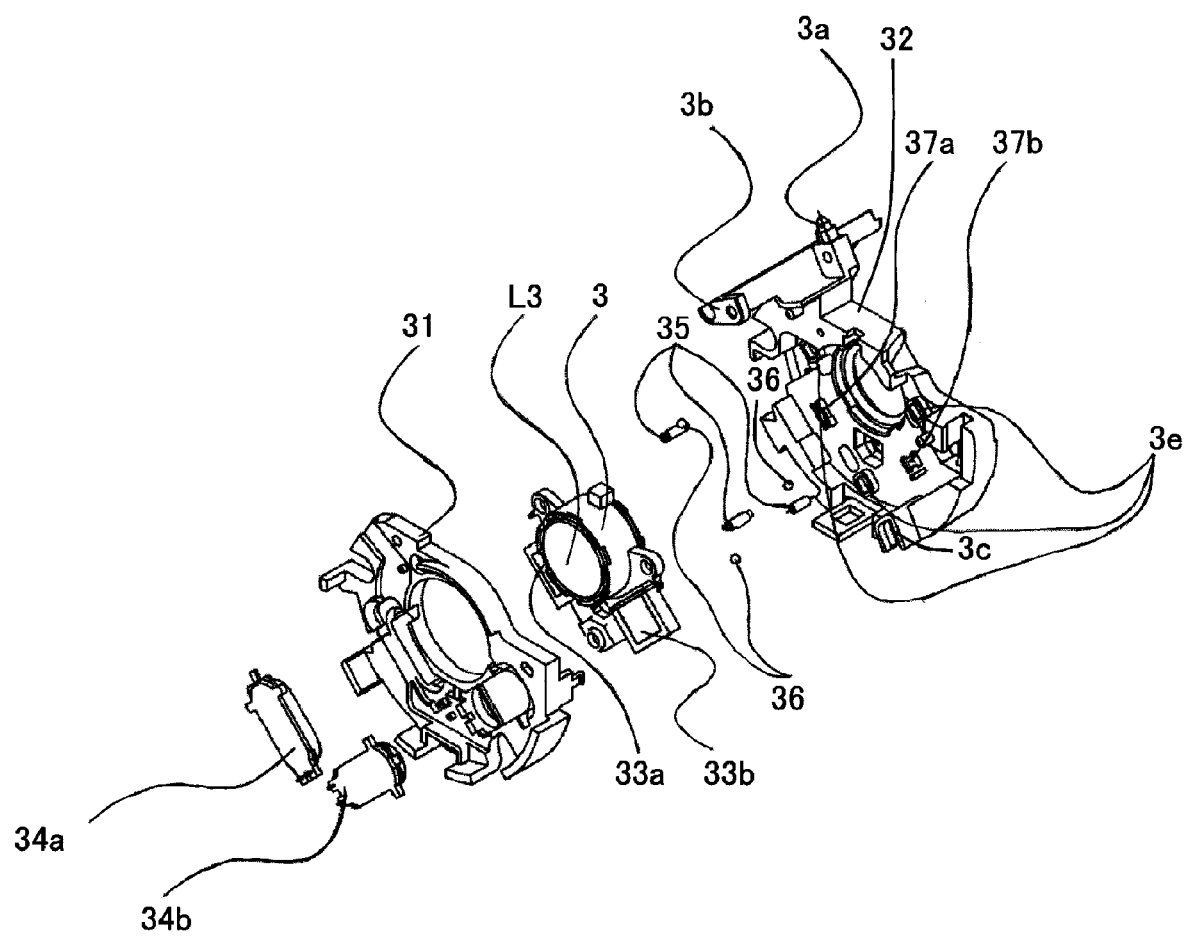
FIG. 9 is an exploded perspective view showing the configuration of an image stabilizing unit in the lens barrel part in Embodiment 1.
Figure 10:
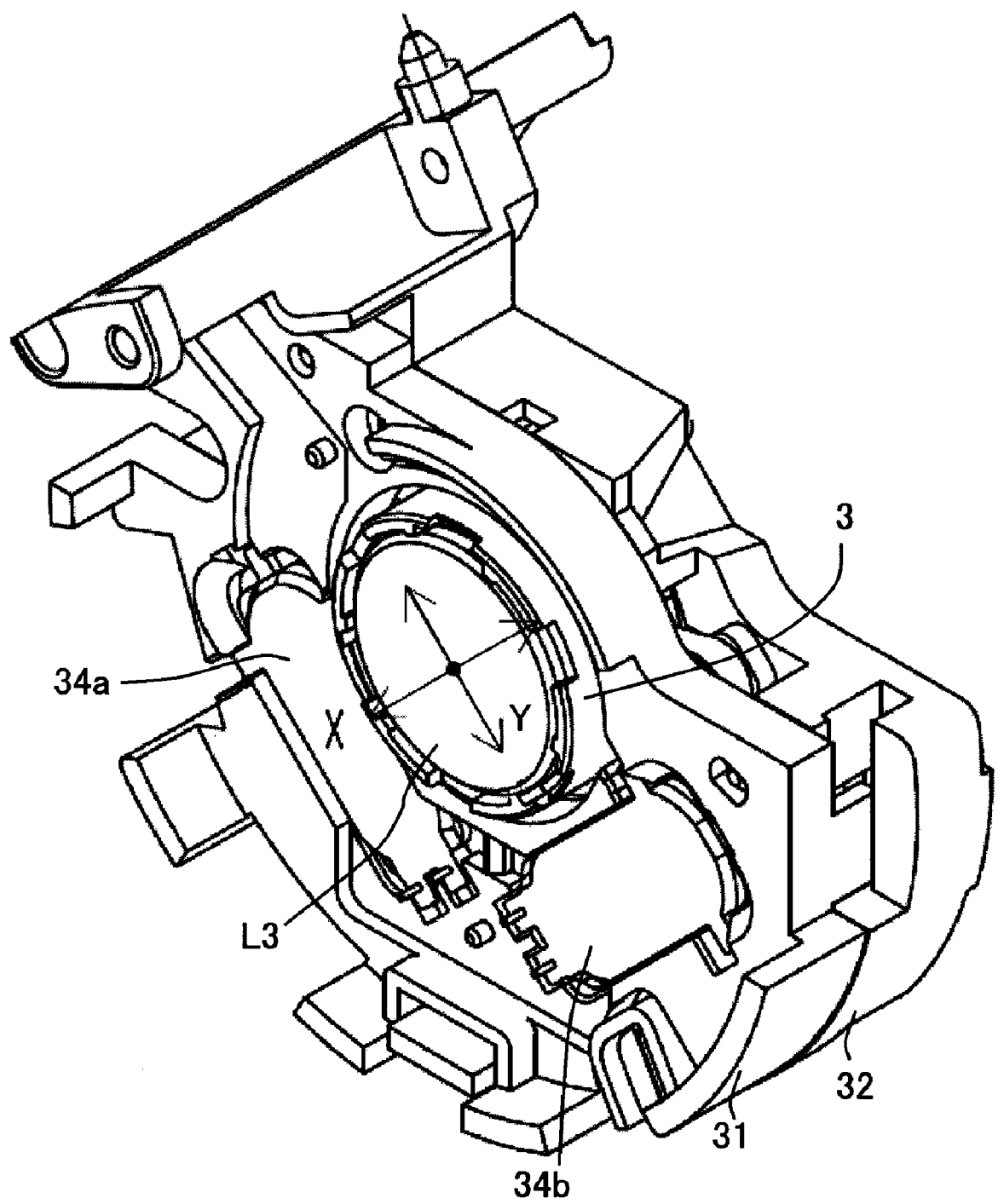
FIG. 10 is a perspective view showing the configuration of the image stabilizing unit in Embodiment 1.

Cam pins 3a are provided on an outer circumferential surface of the sensor holding frame 32. The cam pins 3a engage with cam grooves 8c formed on the inner circumferential surface of the cam barrel 8. Moreover, a sleeve portion 3b and a rotation stop portion 3c are formed in the sensor holding frame 32 as shown in FIGS. 9 and 10. The sleeve portion 3b and the rotation stop portion 3c respectively engage with the guide bars 21 and 22 described above.

The guide bars 21 and 22 supported by the second lens holding barrel 2 and the image sensor base plate 9 support the aperture stop unit 5 and the image stabilizing unit so as to prevent their rotation, but allow their movement in the optical axis direction.

Figure 7:
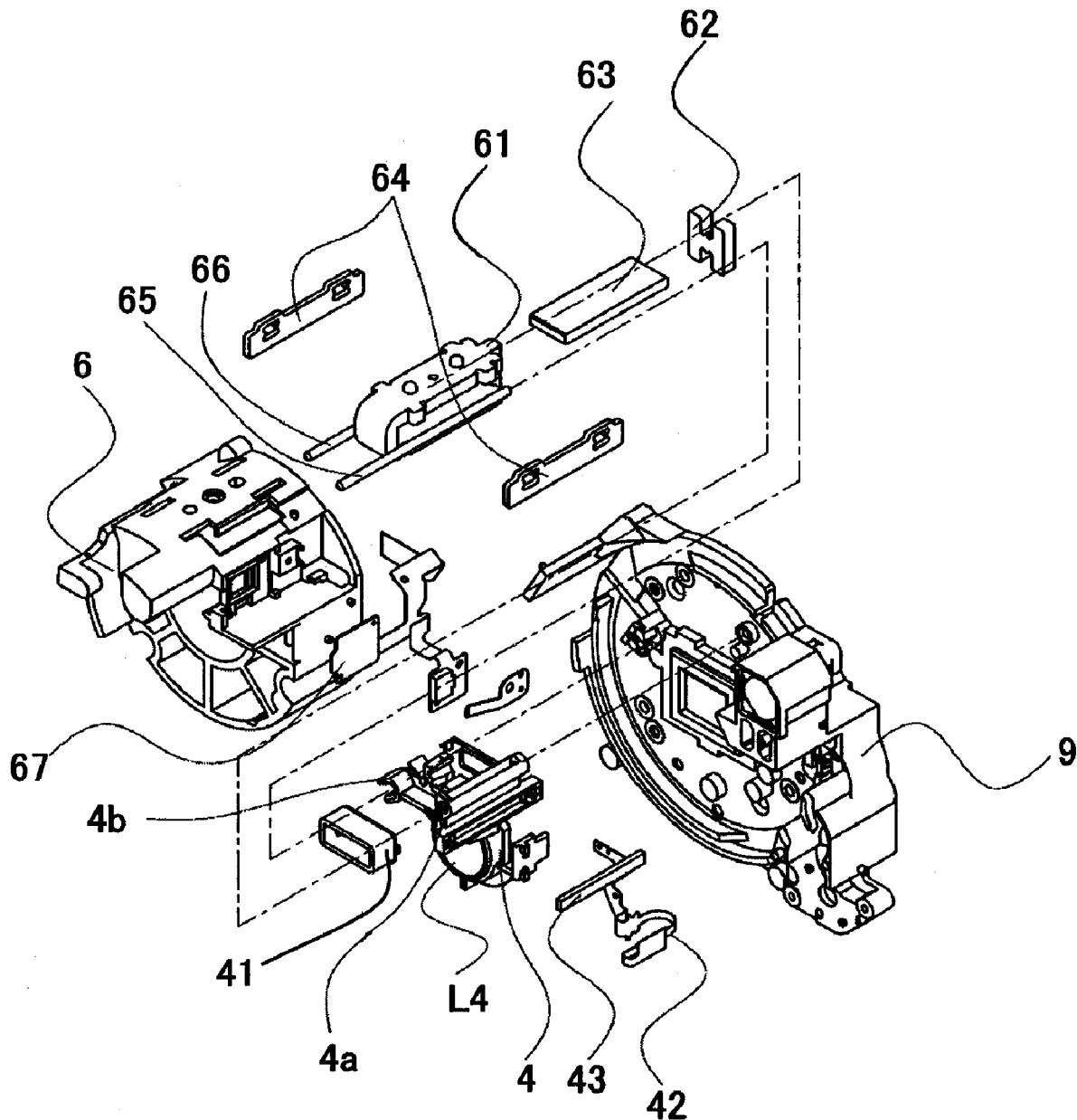
FIG. 7 is an exploded perspective view showing the configuration of a focus driving mechanism in the lens barrel part in Embodiment 1.
Figure 8:
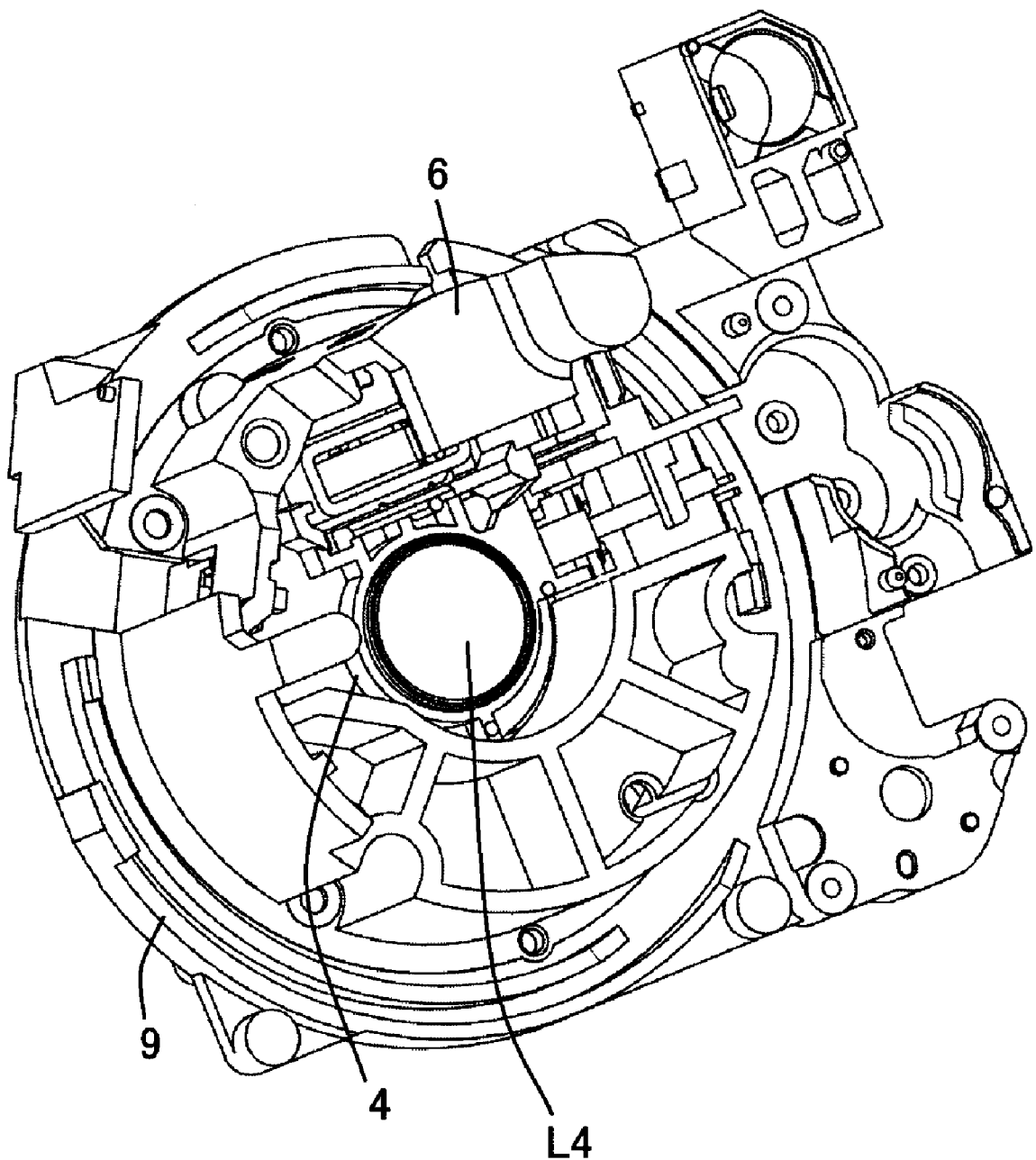
FIG. 8 is a perspective view showing the configuration of part of the focus driving mechanism in Embodiment 1.

Reference numeral 4 denotes a fourth lens holding frame holding the focus lens L4. The fourth lens holding frame 4 has, as shown in FIGS. 7 and 8, a sleeve portion 4a and a rotation stop portion 4b. The sleeve portion 4a and the rotation stop portion 4b respectively engage with guide bars 65 and 66 supported by a focus base member 6 and the image sensor base plate 9 so as to be movable in the optical axis direction.

A gear portion (not shown) is formed in the outer circumferential surface of the cam barrel 8. A rotating force from a zoom motor (not shown) such as a stepping motor is transmitted to the gear portion via a gear train (not shown), which results in rotation of the cam barrel 8. The rotation of the cam barrel 8 moves the cam barrel 8 in the optical axis direction by the engagement of the cam grooves 8e formed in the cam barrel 8 with the cam pins (not shown) provided on the fixed barrel 7.

The first lens holding barrel 1 is moved in the optical axis direction without rotating by the engagement of the cam pins 1a provided on the first lens holding barrel 1 with the cam grooves 8a formed in the cam barrel 8 and the engagement of the straight grooves formed in the first lens holding barrel 1 with the straight keys formed in the fixed barrel 7.

The second lens holding barrel 2 is moved in the optical axis direction without rotating by the engagement of the cam pins 2a provided on the second lens holding barrel 2 with the cam grooves 8b formed in the cam barrel 8 and the straight grooves formed in fixed barrel 7. The movement of the first and second lens holding barrels 1 and 2, that is, the movement of the first and second lens units L1 and L2 in the optical axis direction enables variation of magnification.

The aperture stop unit 5 is moved in the optical axis direction without rotating by the engagement of the cam pins 5a provided on the aperture stop unit 5 with the cam grooves 8d formed in the cam barrel 8 and the engagement of the sleeve portion 5b and the rotation stop portion with the guide bars 21 and 22.

The third lens holding frame 3 is moved in the optical axis direction without rotating by the engagement of the cam pins 3a provided on the third lens holding frame 3 with the cam grooves 8c formed in the cam barrel 8 and the engagement of the sleeve portion 3b and the rotation stop portion 3c with the guide bars 21 and 22.

The image sensor base plate 9 holds an image pickup element 11 such as a CCD sensor or a CMOS sensor, and an infrared-cutting/low-pass filter 10. The fixed barrel 7 and the focus base member 6 are fixed to the image sensor plate 9 with screws (not shown).

Next, description will be made of a focus driving mechanism that drives the fourth lens holding frame 4 holding the focus lens L4 with reference to FIGS. 7 and 8. FIG. 7 is an exploded perspective view of the focus driving mechanism, and FIG. 8 is a perspective view of part of the focus driving mechanism.

An air core coil 41 that has a rectangular tube shape is fixed to the fourth lens holding frame 4. An air core portion of the coil 41 opens in the optical axis direction. A flexible circuit board 42 is connected to the coil 41.

Yokes 61 and 62 and a magnet 63 are fixed to the focus base member 6. The yoke 61 is formed in a U-shape and disposed such that its upper and lower surfaces extend in the optical axis direction.

The magnet 63 is held inside the yoke 61. The Yoke 61 is inserted into the air core portion of the coil 41. The coil 41 is disposed so as to form a certain gap with the yoke 61 and the magnet 63.

The magnet 63 has a longitudinal direction extending in the optical axis direction, and is magnetized in the orthogonal-to-optical axis direction. The yoke 62 formed in an H-shape is attached to an open end portion of the U-shaped yoke 61. The coil 41, the yokes 61 and 62 and the magnet 63 constitute a linear actuator (voice coil motor) which is a focusing actuator as a third actuator.

When energizing the coil 41, a magnetic action in a magnetic circuit formed by the coil 41, the yokes 61 and 62 and the magnet 63 moves the fourth lens holding frame 4 (that is, the focus lens L4) in the optical axis direction, in other words, along the optical axis.

An encoder magnet 43 extending in the optical axis direction is provided on the fourth lens holding frame 4. An MR sensor 67 which is a magnetic sensor is fixed to the focus base member 6 and disposed at a position facing the encoder magnet 43. Movement of the encoder magnet 43 with the fourth lens holding frame 4 with respect to the MR sensor 67 changes magnetism acting on the MR sensor 67, which changes an output from the MR sensor 67. On the basis of the change of the output from the MR sensor 67, a CPU (controller) 100 shown in FIG. 13 can detect a position of the fourth lens holding frame 4. The CPU 100 controls an electric current applied to the coil 41 with reference to information on the position of the fourth lens holding frame 4 detected through the MR sensor 67 to move the focus lens L4 to a target position (in-focus position).

Next, description will be made of the configuration of the image stabilizing unit with reference to FIGS. 9 and 10. FIG. 9 is an exploded perspective view of the image stabilizing unit, and FIG. 10 is a perspective view of the image stabilizing unit.

Magnets 33a and 33b are fixed to the third lens holding frame 3. The magnets 33a and 33b are respectively arranged parallel to an X direction and a Y direction which are orthogonal to each other. The X direction and the Y direction are mutually different directions in the orthogonal-to-optical-axis direction.

The third lens holding frame 3 is held by the sensor holding frame 32 via three coil springs 35 so as to be shiftable in the orthogonal-to-optical-axis direction. The coil springs 35 also bias the third lens holding frame 3 toward the sensor holding frame 32. Balls 36 are arranged between planar portions (not shown) formed at three circumferential places in the third lens holding frame 3 and concave portions 3e formed at three circumferential places in the sensor holding frame 32. The biasing force of the coil springs 35 presses the ball 36 to the planar portions and the concave portions 3e. As a result, the third lens holding frame 3 can shift in the orthogonal-to-optical-axis direction without inclining with respect to the optical axis.

Coils 34a and 34b are fixed to the coil holding frame 31 at positions facing the magnets 33a and 33b. The coil holding frame 31 is fixed to the sensor holding frame 32 with screws (not shown).

The magnet 33a and the coil 34a constitute a first image stabilizing actuator which shifts the third lens holding frame 3 in the X direction, and the magnet 33b and the coil 34b constitute a second image stabilizing actuator which shifts the third lens holding frame 3 in the Y direction. The first image stabilizing actuator corresponds to a first actuator, and the second image stabilizing actuator corresponds to a second actuator.

When applying an electric current to the coil 34a, a magnetic action between the coil 34a and the magnet 33a shifts the third lens holding frame 3 in the X direction. When applying an electric current to the coil 34b, a magnetic action between the coil 34b and the magnet 33b shifts the third lens holding frame 3 in the Y direction.

Reference numerals 37a and 37b denote hall sensors which are magnetic sensors and held by the sensor holding frame 32. The hall sensors 37a and 37b are respectively disposed at positions facing the magnets 33a and 33b so as to form therewith a gap needed for detecting magnetic changes. The movement (shifting) of the magnets 33a and 33b with the third lens holding frame 3 with respect to the hall sensors 37a and 37b changes magnetism acting on each of the hall sensors 37a and 37b, which changes an output from each of the hall sensors 37a and 37b. The CPU 100 shown in FIG. 13 can detect a position of the third lens holding frame 3 (that is, the correcting lens L3) on the basis of the outputs from the hall sensors 37a and 37b.

Figure 13:
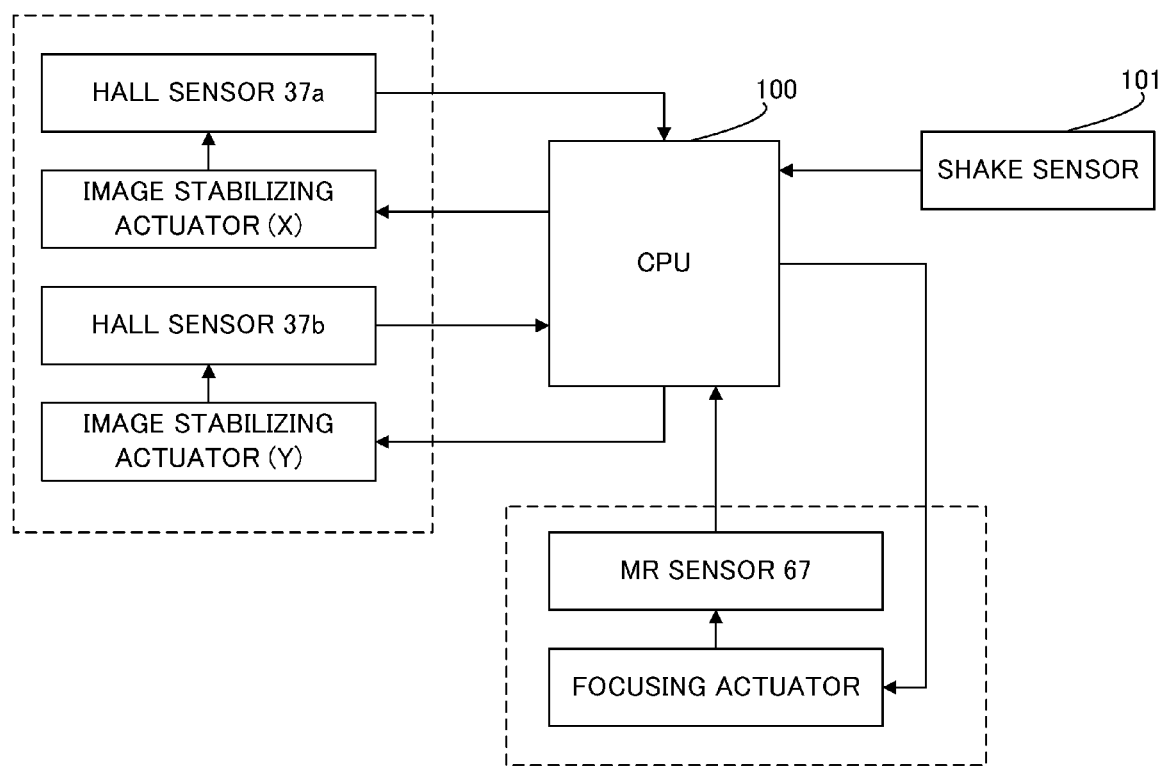
FIG. 13 is a block diagram showing an electrical circuit of the image pickup apparatus of Embodiment 1.

The CPU 100 controls the electric currents applied to the coils 34a and 34b based on an output from a shake sensor 101 shown in FIG. 13 and information on the position of the third lens holding frame 3 obtained through the hall sensors 37a and 37b to shift the correcting lens L3 to a position for reducing image shaking. In this manner, an image stabilizing operation is performed.

Next, description will be made of the arrangement of the voice coil motor as the focusing actuator and the first and second image stabilizing actuators with reference to FIG. 11.

Figure 11:
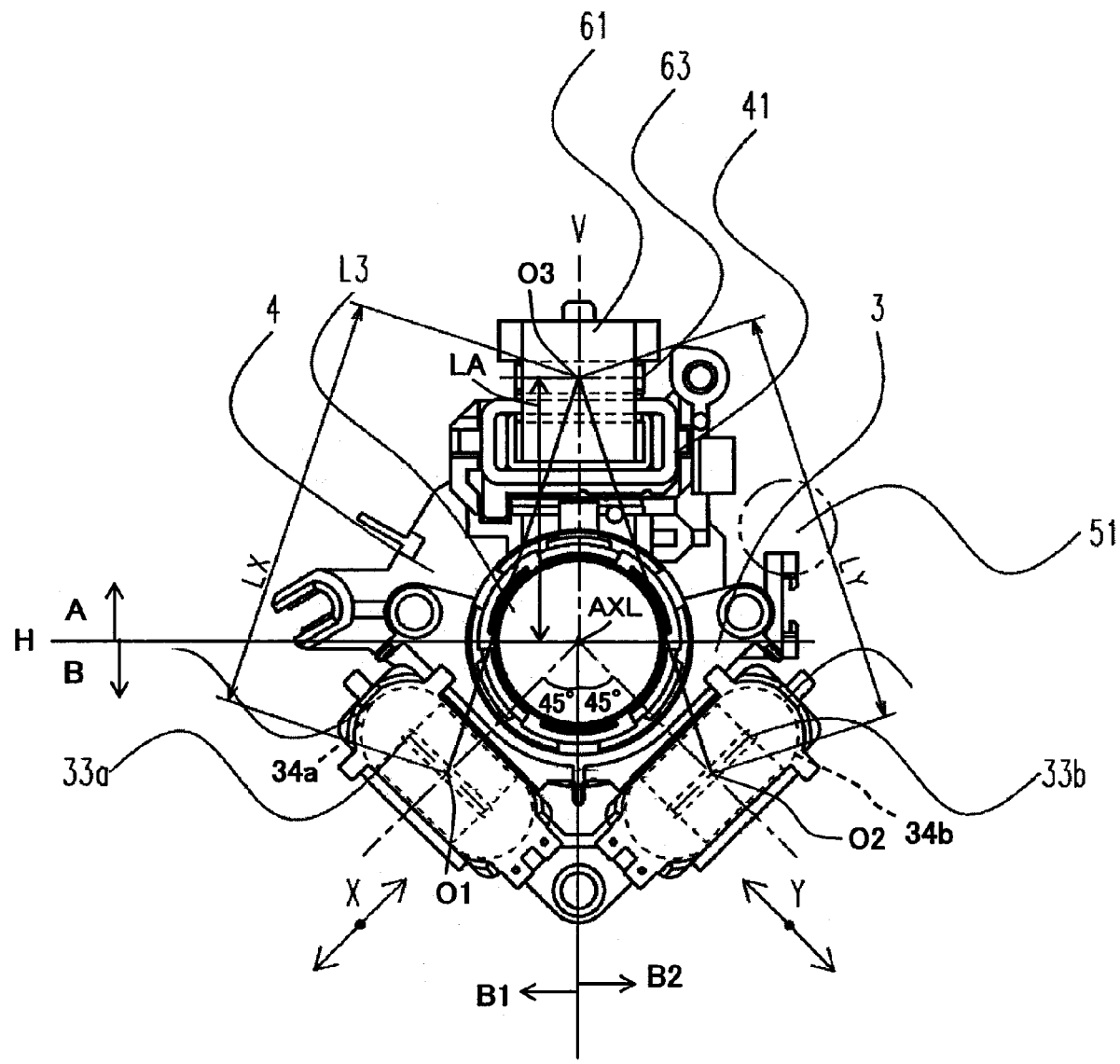
FIG. 11 is a front view showing the arrangement of the focus driving mechanism (focusing actuator) and the image stabilizing unit (first and second image stabilizing actuators) in Embodiment 1.

FIG. 11 is a figure showing the image stabilizing unit when viewed in the direction of the optical axis AXL (optical axis direction). FIG. 11 shows a state in which an image stabilizing operation is not performed, that is, a state in which the third lens holding frame 3 (correcting lens L3) is at its neutral position where an optical axis of the correcting lens L3 coincides with the optical axis AXL of the optical system.

In FIG. 11, an upper area with respect to a straight line H passing a position of the optical axis AXL and extending in a horizontal direction is defined as an area A (second area), and a lower area with respect to the straight line H is defined as an area B (first area). Further, a left area with respect to a straight line V passing the position of the optical axis AXL and (a center O3 of) the focusing actuator and extending in a vertical direction is defined as an area B1. A right area with respect to the straight line V is defined as an area B2.

In the area A, the voice coil motor (41, 61 and 63) is disposed. In the area B which is an opposite area to the area A with respect to the optical axis AXL, the first image stabilizing actuator (33a and 34a) and the second image stabilizing actuator (33b and 34b) are disposed.

The case where "the first and second image stabilizing actuators are disposed in the area B" includes not only a case where the first and second image stabilizing actuators are wholly included in the area B as shown in FIG. 11, but also a case where at least centers O1 and O2 of the first and second image stabilizing actuators are disposed in the area B. Even when an upper part of the image stabilizing actuator protrudes into the area A, if the center (O1 or O2) of the image stabilizing actuator is located in the area B, that image stabilizing actuator can be regarded as being disposed in the area B. This is also the same in a case where the upper part of the image stabilizing actuator protrudes into the area A in the image stabilizing operation.

Each of the centers O1 and O2 of the first and second image stabilizing actuators is not needed to be one strict center point thereof, and may be a point within a region (central portion) near the center point. Further, each of the centers O1 and O2 of the first and second image stabilizing actuators may be a shape centroid or an area centroid of the image stabilizing actuator when viewed in the optical axis direction, or may be a magnetic center or a magnetic centroid when viewed in the optical axis direction.

Moreover, the first image stabilizing actuator is disposed in the area B1, and the second image stabilizing actuator is disposed in the area B2. The case where "the first image stabilizing actuator is disposed in the area B1, and the second image stabilizing actuator is disposed in the area B2" includes a case where the first image stabilizing actuator is wholly included in the area B1 and the second image stabilizing actuator is wholly included in the area B2. However, it may include a case where at least the centers O1 and O2 of the first and second image stabilizing actuators are respectively located in the areas B1 and B2.

Thus, in this embodiment, when viewed in the optical axis direction, the first and second image stabilizing actuators are disposed in the area B which is an area opposite to the area A with respect to the optical axis AXL, the area A being an area where the focusing actuator is disposed. Moreover, the first and second image stabilizing actuators are respectively disposed in the areas B1 and B2 which are areas opposite to each other with respect to the straight line V passing the position of the optical axis AXL and the focusing actuator.

In addition, when viewed in the optical axis direction, in the state where the third lens holding frame 3 is at the neutral position, a distance LX between the focusing actuator and the first image stabilizing actuator is equal to a distance LY between the focusing actuator and the second image stabilizing actuator. The distance LX herein means a distance between the center (or the central portion) O3 of the focusing actuator and the center (or the central portion) O1 of the first image stabilizing actuator. The distance LY herein means a distance between the center (or the central portion) O3 of the focusing actuator and the center (or the central portion) O2 of the second image stabilizing actuator.

In other words, in this embodiment, when viewed in the optical axis direction, the first and second image stabilizing actuators are arranged at positions symmetric to each other with respect to the straight line V passing the position of the optical axis AXL and the center (or the central portion) O3 of the focusing actuator.

The first and second image stabilizing actuators which shift the third lens holding frame 3 in the X and Y directions orthogonal to each other are arranged, when viewed in the optical axis direction, at positions whose phases are different from each other by 90 degrees. Therefore, it can be said that the first and second image stabilizing actuators are arranged such that a straight line passing the center (or the central portion) O1 of the first image stabilizing actuator and the position of the optical axis AXL and a straight line passing the center (or the central portion) O2 of the second image stabilizing actuator and the position of the optical axis AXL respectively form an angle of 45 degrees with the straight line V.

It is not necessary that the distance LX be strictly coincident with the distance LY, that is, the distance LX and the distance LY may have a small difference such that they can be regarded as being coincident with each other. Further, it is not necessary that the "positions symmetric to each other" and the "45 degrees" be positions strictly symmetric to each other and strictly 45 degrees, respectively. That is, they may be within ranges that can be regarded as being positions symmetric to each other and 45 degrees.

Moreover, in this embodiment, when viewed in the optical axis direction, the focusing actuator which is the third actuator is disposed at a position (O3) away from the optical axis AXL by a first distance LA. Further, the first and second image stabilizing actuators are disposed at positions (O1 and O2) away from the center O3 of the focusing actuator by a second distance (LX and LY) longer than the first distance LA.

As described above, if the first and second image stabilizing actuators are disposed in the area B (areas B1 and B2), the equality between the distances LX and LY and the symmetric arrangement or the 45-degree arrangement of the first and second image stabilizing actuators, which were described above, are not necessarily required.

The above-described arrangement of the first and second image stabilizing actuators can distance them from the focusing actuator. In this embodiment, as compared with a case where two image stabilizing actuators are arranged as disclosed in Japanese Patent Laid-Open No. 2003-295249, though the distance from the focusing actuator to one of the two (first and second) image stabilizing actuators is slightly shorter, the distance from the focusing actuator to the other one of the two image stabilizing actuators can be drastically longer. Therefore, the arrangement in this embodiment can reduce magnetic interference between the focusing actuator and the two image stabilizing actuators. Moreover, the arrangement in this embodiment can prevent leakage magnetic fluxes from the two image stabilizing actuators from influencing the MR sensor 67, and can prevent a leakage magnetic flux from the focusing actuator from influencing the hall sensors 37a and 37b.

Further, in this embodiment, when viewed in the optical axis direction, the stop actuator 51 is disposed in an area where the focusing actuator and the two image stabilizing actuators are not disposed.

Moreover, in this embodiment, providing magnetic shield plates 64 to both sides of the focusing actuator reduces the leakage magnetic flux from the focusing actuator. This can further reduce, with the arrangement of the image stabilizing actuators with respect to the focusing actuator, the magnetic interference between the focusing actuator and the two image stabilizing actuators.

Furthermore, in this embodiment, the focusing actuator is long in length in the optical axis direction. Thus, the focusing actuator is disposed so as to be located in an upper portion of the lens barrel part when the image pickup apparatus is used at its normal position, in order to prevent generation of ghost and flare caused by light reflected by the focusing actuator. In this case, the two image stabilizing actuators are located in a lower portion of the lens barrel part.

FIG. 13 shows the configuration of an electrical circuit which includes the CPU 100, the shake sensor 101, the first and second image stabilizing actuators (X,Y), the hall sensors 37a and 37b, the focusing actuator, and the MR sensor 67. The shake sensor 101 comprises an angular velocity sensor, an acceleration sensor or the like, and outputs a signal corresponding to shaking of the image pickup apparatus. The CPU 100 amplifies the signal from the shake sensor 101, integrates this signal to generate a shake displacement signal, and then calculates a target position to which the third lens holding frame 3 (correcting lens L3) should be shifted based on the shake displacement signal.

The CPU 100 applies electric currents to the coils 34a and 34b of the first and second image stabilizing actuators, the electric currents corresponding to a difference between the calculated target position and a position of the third lens holding frame 3 detected by output signals from the hall sensors 37a and 37b. Thus, the CPU 100 performs feedback control of the first and second image stabilizing actuators to shift the correcting lens L3 to the target position.

Figure 12:
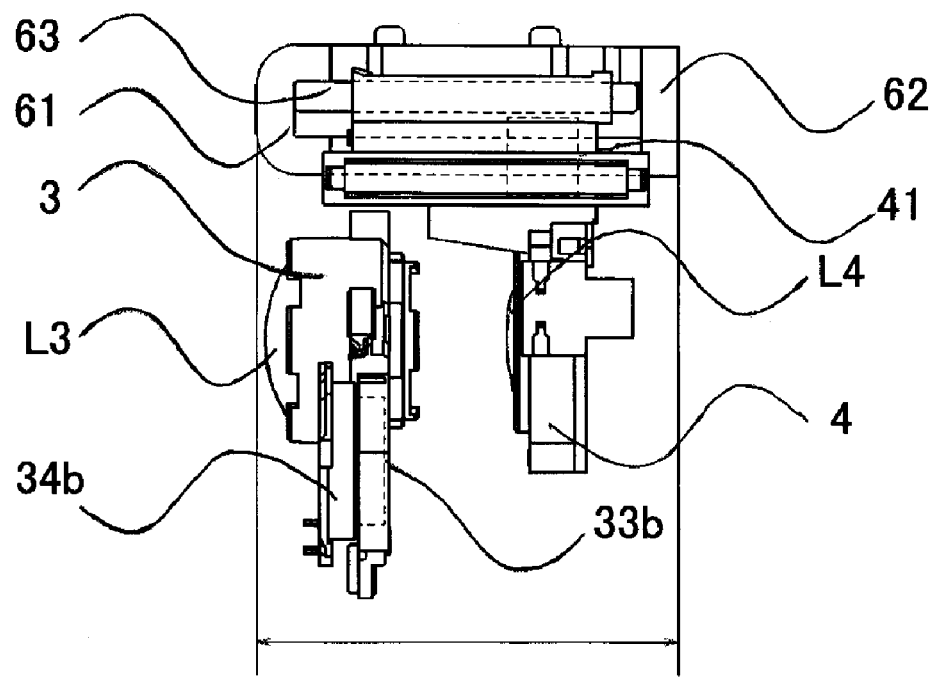
FIG. 12 is a side view showing the arrangement of the focus driving mechanism (focusing actuator) and the image stabilizing unit (first and second image stabilizing actuators) in Embodiment 1.
Figure 12:
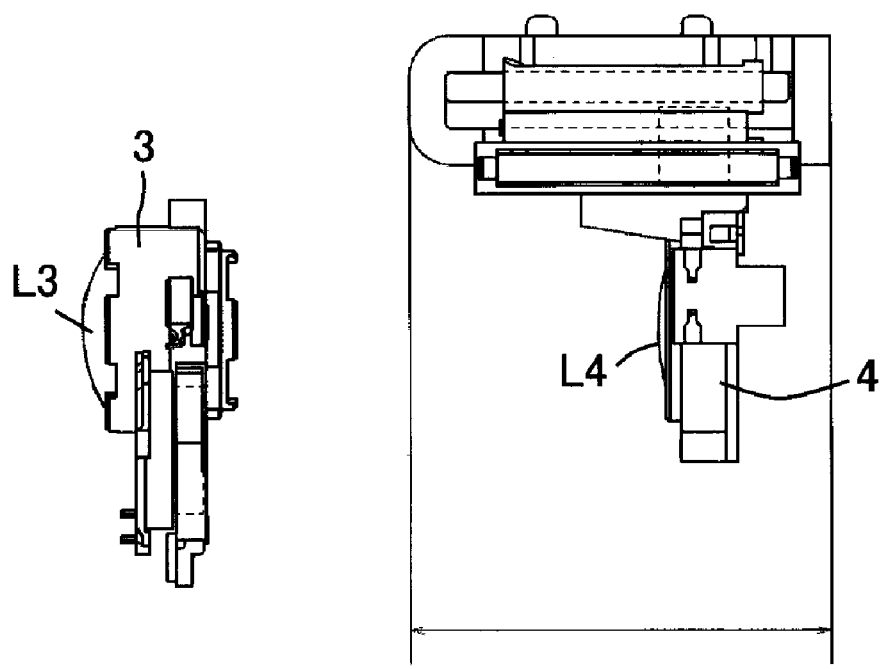

In the embodiment, as shown in FIGS. 1 to 6 and FIG. 12, the image stabilizing unit is moved in the optical axis direction in a magnification varying (zooming) operation of the optical system between the WIDE position and the TELE position. In this magnification varying operation, relative positions of the two image stabilizing actuators and the focusing actuator in the optical axis direction is changed. Therefore, a distance in the optical axis direction between the two image stabilizing actuators and the focusing actuator is varied. This distance variation according to change of a magnification variation state (that is, a zoom position) changes a degree of the magnetic interference between the image stabilizing actuator and the focusing actuator. A short distance in the optical axis direction between the image stabilizing actuator and the focusing actuator causes a repulsive force or an attractive force to act between these actuators, which results in deterioration of drive responsiveness of the correcting lens L3 in the image stabilizing unit. In this embodiment, as shown in FIG. 12, the first and second image stabilizing actuators and the focus actuator are relatively movable in the optical axis direction from a WIDE state to a TELE state. Further, the first and second image stabilizing actuators are moved closer to an object than the focusing actuator in the TELE state. That is, the first and second image stabilizing actuators are moved in an area where the image stabilizing actuators do not receive the magnetic flux from the focusing actuator. Such a movement of the image stabilizing actuators to an area where the image stabilizing actuators receive the magnetic flux from the focusing actuator and to the area where the image stabilizing actuators do not receive the magnetic flux from the focusing actuator changes the degree of the magnetic interference therebetween.

Thus, in this embodiment, according to the magnification variation state, in other words, according to the distance in the optical axis direction between the first and second image stabilizing actuators and the focusing actuator, parameters used by the CPU 100 for controlling the first and second image stabilizing actuators are changed. The parameters include, for example, an integration gain in a feedback loop using the signals from the hall sensors 37a and 37b and an amplification gain to amplify the signal from the shake sensor 101. However, parameters other than these parameters may be changed.

Figure 14:
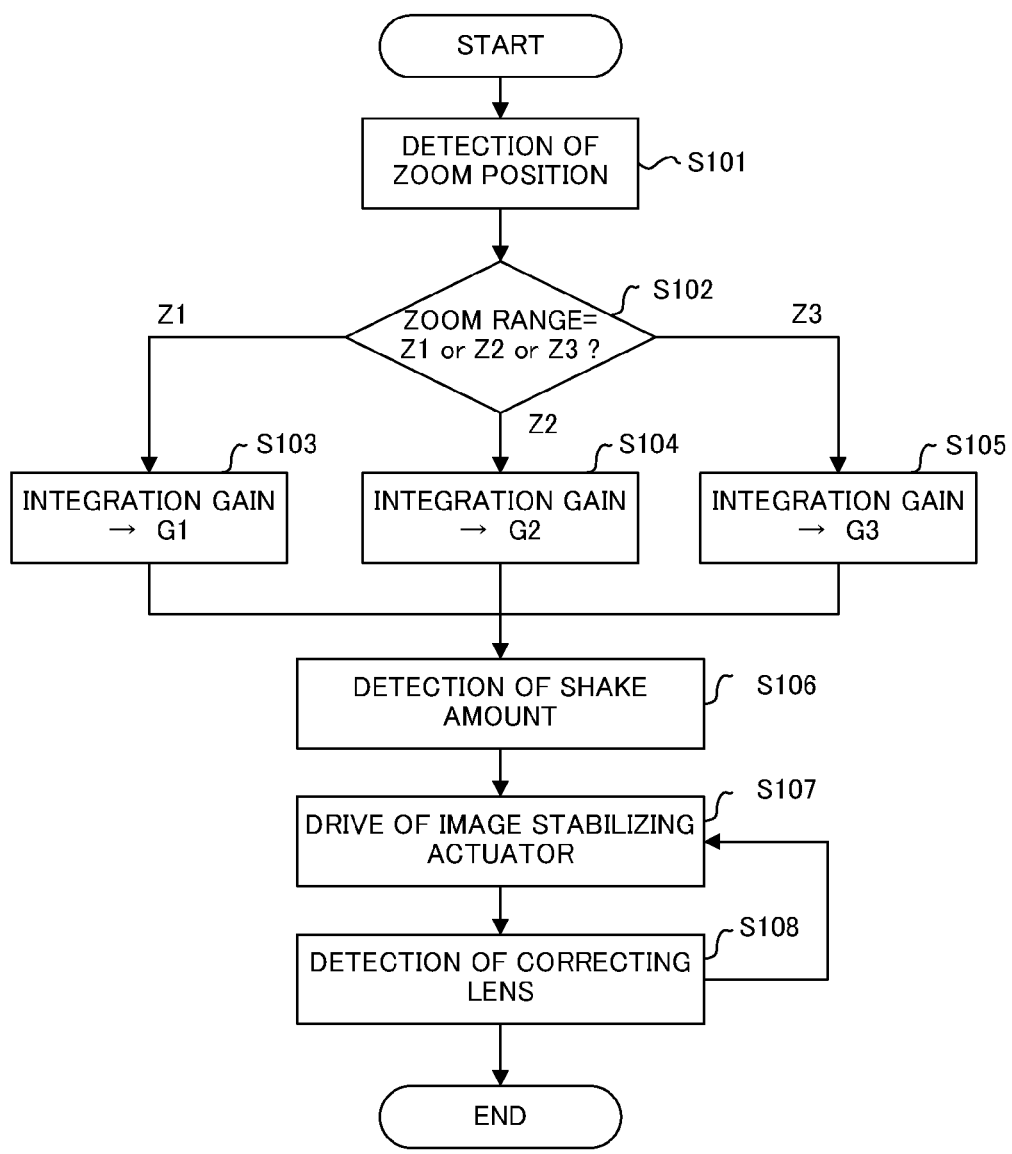
FIG. 14 is a flowchart for controlling the image stabilizing unit in Embodiment 1.

The flowchart of FIG. 14 shows an operation example of the CPU 100 changing the integration gain according to the zoom position. This operation is performed based on a computer program stored in the CPU 100. Description will hereinafter be made of, as shown above the flowchart in FIG. 14, a case where the entire zoom range between the WIDE position and the TELE position is divided into three zoom ranges Z1, Z2 and Z3 and the integration gain in the above-mentioned feedback loop is changed.

At step S101, the CPU 100 detects a current zoom position. The current zoom position is obtained by detecting a rotation amount of the zoom motor or the cam barrel 8 with reference to the WIDE position or by detecting the position of the second lens holding barrel 2 in the optical axis direction.

At step S102, the CPU 100 determines which zoom range the detected current zoom position is included in among the zoom ranges Z1, Z2 and Z3. If the current zoom position is included in the zoom range Z1, the process proceeds to step S103 where the CPU 100 sets the integration gain to G1. If the current zoom position is included in the zoom range Z2, the process proceeds to step S104 where the CPU 100 sets the integration gain to G2. If the current zoom position is included in the zoom range Z3, the process proceeds to step S105 where the CPU 100 sets the integration gain to G3. The integration gains G1, G2 and G3 have a relationship of G1<G2<G3, for example.

At step S106, the CPU 100 detects a shake amount (that is, generates a shake displacement amount) by using the signal from the shake sensor 101. Further, at step S107, the CPU 100 calculates a target position of the third lens holding frame 3 as described above, and then drives the first and second image stabilizing actuators. At this point, at step 108, the CPU 100 detects a position of the third lens holding frame 3 using the signals from the hall sensors 37a and 37b, and then returns to step S107 to apply electric currents corresponding to a difference between the target position and the detected position to the coils 34a and 34b of the first and second image stabilizing actuators.

Embodiment 2

Embodiment 1 has described the operation in which the parameters used by the CPU 100 for controlling the first and second image stabilizing actuators are changed according to the distance in the optical axis direction between the image stabilizing actuators and the focusing actuator. In a second embodiment (Embodiment 2) of the present invention, instead of or in addition to that operation, parameters used by the CPU 100 for controlling the focusing actuator according to the zoom position (that is, the distance in the optical axis direction between the image stabilizing actuators and the focus actuator) are changed. The parameters include, for example, an integration gain in a feedback loop using the signal from the MR sensor 67. However, parameters other than this parameter may be changed. The basic configuration of an image pickup apparatus of this embodiment is the same as that of Embodiment 1. In the present embodiment, components having same or similar functions as those in Embodiment 1 are denoted by the same reference numerals in Embodiment 1.

Figure 15:
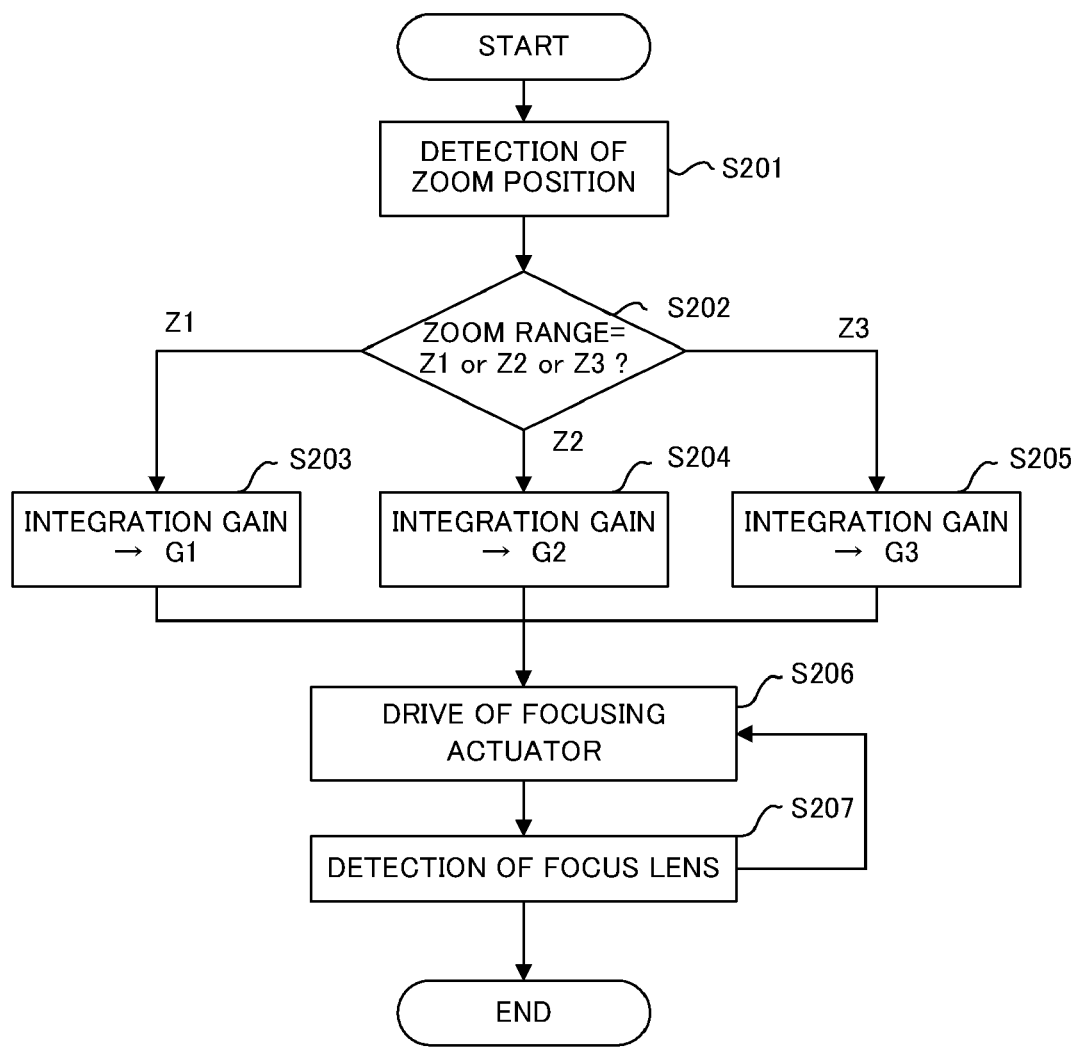
FIG. 15 is a flowchart for controlling a focusing actuator in an image pickup apparatus that is Embodiment 2 of the present invention.

The flowchart of FIG. 15 shows an operation example of the CPU 100 changing the integration gain according to the zoom position. This operation is performed based on a computer program stored in the CPU 100. Description will hereinafter be made of, as shown above the flowchart in FIG. 15, a case where the entire zoom range between the WIDE position and the TELE position is divided into three zoom ranges Z1, Z2 and Z3 and the integration gain in the above-mentioned feedback loop is changed.

At step S201, the CPU 100 detects a current zoom position. The current zoom position is obtained by detecting a rotation amount of the zoom motor or the cam barrel 8 with reference to the WIDE position or by detecting the position of the second lens holding barrel 2 in the optical axis direction.

At step S202, the CPU 100 determines which zoom range the detected current zoom position is included in among the zoom ranges Z1, Z2 and Z3. If the current zoom position is included in the zoom range Z1, the process proceeds to step S203 where the CPU 100 sets the integration gain to G1. If the current zoom position is included in the zoom range Z2, the process proceeds to step S204 where the CPU 100 sets the integration gain to G2. If the current zoom position is included in the zoom range Z3, the process proceeds to step S205 where the CPU 100 sets the integration gain to G3. The integration gains G1, G2 and G3 have a relationship of G$1$<G$2$<G$3$, for example.

At step 206, the CPU 100 calculates a target position of the fourth lens holding frame 4, and then drives the focusing actuator. At this point, at step S207, the CPU 100 detects a position of the fourth lens holding frame 4 using the signal from the MR sensor 67, and then returns to step S206 to apply an electric current corresponding to a difference between the target position and the detected position to the coil 41 of the focusing actuator.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, Embodiments 1 and 2 have described the case where magnetic sensors are used to detect the positions of the correcting lens L3 and the focus lens L4. However, instead of such magnetic sensors, optical sensors may be used.

Moreover, Embodiments 1 and 2 have described the image pickup apparatus. However, alternative embodiments of the present invention include an interchangeable lens (optical apparatus).

This application claims the benefit of Japanese Patent Application No. 2008-096903, filed on Apr. 3, 2008, which is hereby incorporated by reference herein in its entirety.

What is claimed is:

1. An optical apparatus comprising:
   an image stabilizing lens which is shiftable with respect to an optical axis of an optical system;
   a movable lens which is movable in a direction of the optical axis;
   a first actuator and a second actuator each of which comprises a magnet and a coil, the first and second actuators shifting the image stabilizing lens in directions different from each other; and
   a third actuator which comprises a magnet and a coil and moves the movable lens,
   wherein, when viewed in the direction of the optical axis, the first and second actuators are disposed in a first area and the third actuator is disposed in a second area, the first and second areas being opposite to each other with respect to the optical axis, and the first and second actuators are respectively disposed in areas in the first area which are opposite to each other with respect to a straight line passing a position of the optical axis and the third actuator, and
   wherein the first and second actuators and the third actuator are relatively movable in the direction of the optical axis.

2. The optical apparatus according to claim 1, wherein, when viewed in the direction of the optical axis, in a state where the image stabilizing lens is at a neutral position, a distance between the third actuator and the first actuator is equal to that between the third actuator and the second actuator.

3. The optical apparatus according to claim 1, wherein, when viewed in the direction of the optical axis, the first and second actuators are disposed at positions symmetric to each other with respect to a straight line passing the position of the optical axis and the third actuator.

4. The optical apparatus according to claim 1, wherein the first and second actuators are movable closer to an object than the third actuator by the relative movement thereof in the direction of the optical axis.

5. The optical apparatus according to claim 1,
   wherein a distance between the first and second actuators and the third actuator in the direction of the optical axis is changed with an operation of the optical system,
   wherein the apparatus includes a controller configured to control the first and second actuators, and
   wherein the controller changes a parameter for controlling the first and second actuators according to the distance.

6. The optical apparatus according to claim 1,
   wherein a distance between the first and second actuators and the third actuator in the direction of the optical axis is changed with an operation of the optical system,
   wherein the apparatus includes a controller configured to control the third actuator, and
   wherein the controller changes a parameter for controlling the third actuator according to the distance.

7. An image pickup apparatus comprising:
   an image stabilizing lens which is shiftable with respect to an optical axis of an optical system;
   a movable lens which is movable in a direction of the optical axis;
   a first actuator and a second actuator each of which comprises a magnet and a coil, the first and second actuators shifting the image stabilizing lens in directions different from each other; and
   a third actuator which comprises a magnet and a coil and moves the movable lens,
   wherein, when viewed in the direction of the optical axis, the first and second actuators are disposed in a first area and the third actuator is disposed in a second area, the first and second areas being opposite to each other with respect to the optical axis, and the first and second actuators are respectively disposed in areas in the first area which are opposite to each other with respect to a straight line passing a position of the optical axis and the third actuator, and
   wherein the first and second actuators and the third actuator are relatively movable in the direction of the optical axis.

8. The image pickup apparatus according to claim 7, wherein, when viewed in the direction of the optical axis, in a state where the image stabilizing lens is at a neutral position, a distance between the third actuator and the first actuator is equal to that between the third actuator and the second actuator.

9. The image pickup apparatus according to claim 7, wherein, when viewed in the direction of the optical axis, the first and second actuators are disposed at positions symmetric to each other with respect to a straight line passing the position of the optical axis and the third actuator.

10. The image pickup apparatus according to claim 7, wherein the first and second actuators are movable closer to an object than the third actuator by the relative movement thereof in the direction of the optical axis.

11. The image pickup apparatus according to claim 7,
wherein a distance between the first and second actuators and the third actuator in the direction of the optical axis is changed with an operation of the optical system,
wherein the apparatus includes a controller configured to control the first and second actuators, and
wherein the controller changes a parameter for controlling the first and second actuators according to the distance.

12. The image pickup apparatus according to claim 7,
wherein a distance between the first and second actuators and the third actuator in the direction of the optical axis is changed with an operation of the optical system,
wherein the apparatus includes a controller configured to control the third actuator, and
wherein the controller changes a parameter for controlling the third actuator according to the distance.

* * * * *